United States Patent [19]

Klein-Albenhausen

[11] Patent Number: 4,566,232

[45] Date of Patent: Jan. 28, 1986

[54] LARGE VOLUME SILO FOR BULK MATERIAL, PARTICULARLY RAW CEMENT POWDER

[75] Inventor: Heinrich Klein-Albenhausen, Hamburg, Fed. Rep. of Germany

[73] Assignee: Ibau Barcelona, S.A., Barcelona, Spain

[21] Appl. No.: 563,778

[22] Filed: Dec. 21, 1983

[51] Int. Cl.⁴ ............................................. B65G 65/40

[52] U.S. Cl. ........................................ 52/195; 52/197; 193/29; 222/561; 414/375

[58] Field of Search ................. 52/197, 192, 195, 245; 222/559, 560, 561; 193/25 A, 29; 198/301, 507, 718, 748; 414/298, 299, 318, 325, 326, 327

[56] References Cited

U.S. PATENT DOCUMENTS

| | | | |
|---|---|---|---|
| 1,565,121 | 12/1925 | Thompson et al. | 52/195 X |
| 3,170,609 | 2/1965 | Dorey | 222/559 X |
| 3,319,807 | 5/1967 | Van Raden | 52/197 X |
| 3,365,812 | 1/1968 | Borrow | 414/326 X |
| 3,888,390 | 6/1975 | Grau | 222/561 X |
| 3,889,826 | 6/1975 | Pate | 414/325 |
| 4,125,970 | 11/1978 | Vidal | 52/197 X |
| 4,161,255 | 7/1979 | Ropert | 414/325 X |
| 4,273,267 | 6/1981 | Conca | 222/561 X |
| 4,475,672 | 10/1984 | Whitehead | 222/561 |

FOREIGN PATENT DOCUMENTS

| | | | |
|---|---|---|---|
| 2455246 | 5/1976 | Fed. Rep. of Germany | 52/197 |
| 44990 | 3/1928 | Norway | 52/197 |

OTHER PUBLICATIONS

Neues Zentralsilosystem und Rohmehldosierung mit Digitalem Regler und Mikorprozessor [New Central Silo System and Rawmeal Flow Control via Digital Controller and Microprocessor]; Von G. Hendriock, New York; Zement-Kalk-Gips-Nr. 8/1983, pp. 450–453.

*Primary Examiner*—Donald G. Kelly
*Assistant Examiner*—Richard E. Chilcot, Jr.
*Attorney, Agent, or Firm*—Staas & Halsey

[57] ABSTRACT

A large volume silo has in the center of the base a conical dome which, together with the cylindrical outer silo wall, defines an annular base. Open air conveyor chutes pass from the base area through discharge openings to flow regulators in the inner area beneath the conical dome. Closed air conveyor chutes follow on from the flow regulators and lead to a common storage tank in the inner area beneath the conical dome. The open air conveyor chutes can be separated from the bulk material in the silo area by cover slides moveable from the inner area of the conical dome over the open air conveyor chute. This repairs to the conveyor chutes without interrupting silo operation. The cover slides are operated from the interior of the conical dome.

5 Claims, 2 Drawing Figures

LARGE VOLUME SILO FOR BULK MATERIAL, PARTICULARLY RAW CEMENT POWDER

BACKGROUND OF THE INVENTION

The present invention relates to a large volume silo for bulk material, particularly raw cement powder, with an annular silo base formed by a conical dome. Open air conveyor chutes pass radially inwards to discharge openings in the conical dome and terminate at flow regulators which are arranged adjacent to the discharge openings in the inner area of the conical dome and which are randomly controllable. Closed air conveyor chutes pass from the flow regulators to a storage tank.

A large volume silo is known in which the open air conveyor chutes conveying the bulk material from the vicinity of the silo bottom to the flow regulators are installed in a fixed manner. The flow regulators can be controlled in a random manner, i.e., they can be opened or closed to a greater or lesser extent as desired. Thus, the quantity of bulk material supplied to the storage tank is controlled and simultaneously mixing is influenced by cone formation in the silo area (see West German Publication DAS No. 23 52 455).

If the bulk material is, for example, raw cement powder for producing clinker bricks in a rotary furnace or kiln, at least two large volume silos are required for operating a rotary kiln in order to ensure that the kiln can always be supplied with raw powder. If it is necessary to interrupt the operation of one large volume silo, for example for repair purposes particularly in the vicinity of the air conveyor chutes, then the rotary kiln can be still supplied by the other large volume silo. The interruption to the operation of a rotary kiln is very disadvantageous for economic reasons.

SUMMARY OF THE INVENTION

The object of the invention is to provide a large volume silo of the aforementioned type, which is constructed in such a way that there is no need to interrupt operation for repairing or replacing the open air conveyor chutes and so that fundamentally it is sufficient to have one large volume silo in conjunction with one rotary kiln.

According to the invention, this object is achieved in that the open air conveyor chutes can be separated from the silo area by cover plates or slides, which can be slid over the open air conveyor chutes from the inner area beneath the conical dome. Therefore, the open air chutes are freed from the bulk material in the silo area. If it is necessary to replace an air conveying chute, then the associated cover slide is moved out of the inner area of the conical dome over the open air conveyor chute. Thus, the bulk load is removed from that air conveyor chute and that chute can then be removed from the inner area of the conical dome and replaced by a new air conveyor chute. Thus, the operation of the silo, i.e. the supply of material from the storage tank, does not have to be interrupted. The material supply instead can be taken over by the other open air conveyor chutes with corresponding control using the flow regulators, in order to ensure the desired bulk material flow.

According to the invention, it is advantageous for the cover slides to be guided in rails, which are arranged in the ramps of the silo base and pass in the vicinity of the discharge openings formed in the conical dome.

If, for example, the rotary kiln is to be supplied from a large volume silo according to the invention and whose kiln operation must never be interrupted, then in principle one large volume silo is sufficient. Repairs to the open air conveyor chutes can be carried out during kiln operation by advancing the cover slide into the corresponding position over the chute. It is obviously also possible to supply several kilns from one large volume silo.

BRIEF DESCRIPTION OF THE DRAWINGS

The invention is described in greater detail hereinafter relative to a non-limitative embodiment and the attached drawings, wherein.

DETAILED DESCRIPTION OF THE PREFERRED EMBODIMENT

A silo area 1 is formed by a cylindrical outer wall 13. Although not shown, material supply means are provided in the upper region of the silo area 1. A silo base is defined by a conical dome 2, together with the cylindrical outer wall 13. The silo base is annular and has ramps 11.

Figure 1:
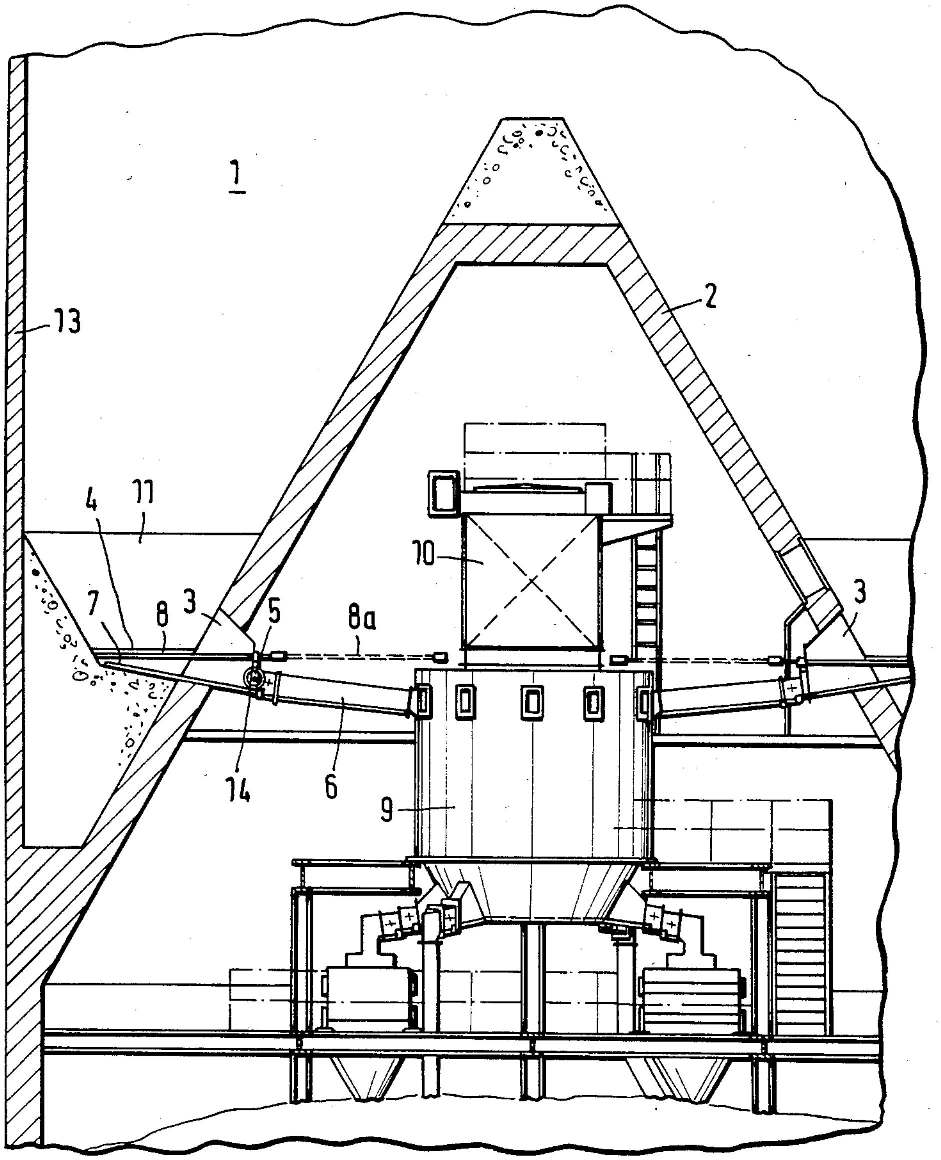
FIG. 1 is a longitudinal partial cross-sectional view through the bottom area of a large volume silo in accordance with the invention.

In the represented embodiment, there are in all twelve (12) removal sections arranged in star-like or radial manner on the annular silo base. Each section is formed by two of the ramps 11, and slopes downwards toward a corresponding open air conveyor chute 7. The chutes 7 are always located at the lowest point of each section defined by two ramps 11 and lead to discharge openings 3 in the wall of conical dome 2. Following each discharge opening 3, the open air conveyor chutes 7 terminate at mounting plates 14 for flow regulators 5, which are connected by means of closed air conveyor chutes 6 to a storage tank 9. There is a filter 10 on storage tank 9. There are rails 4 over the open air conveyor chutes 7 in ramps 11 and are used for guiding cover slides 8. If the cover slides 8 are moved out of the inner area beneath the conical Dome 2, then they assume the position indicated in FIG. 1 by the continuous lines. In their retracted position **8*a*, the cover slides 8 are located in the inner area beneath the conical dome as shown by the broken lines in FIG. 1**.

Figure 2:
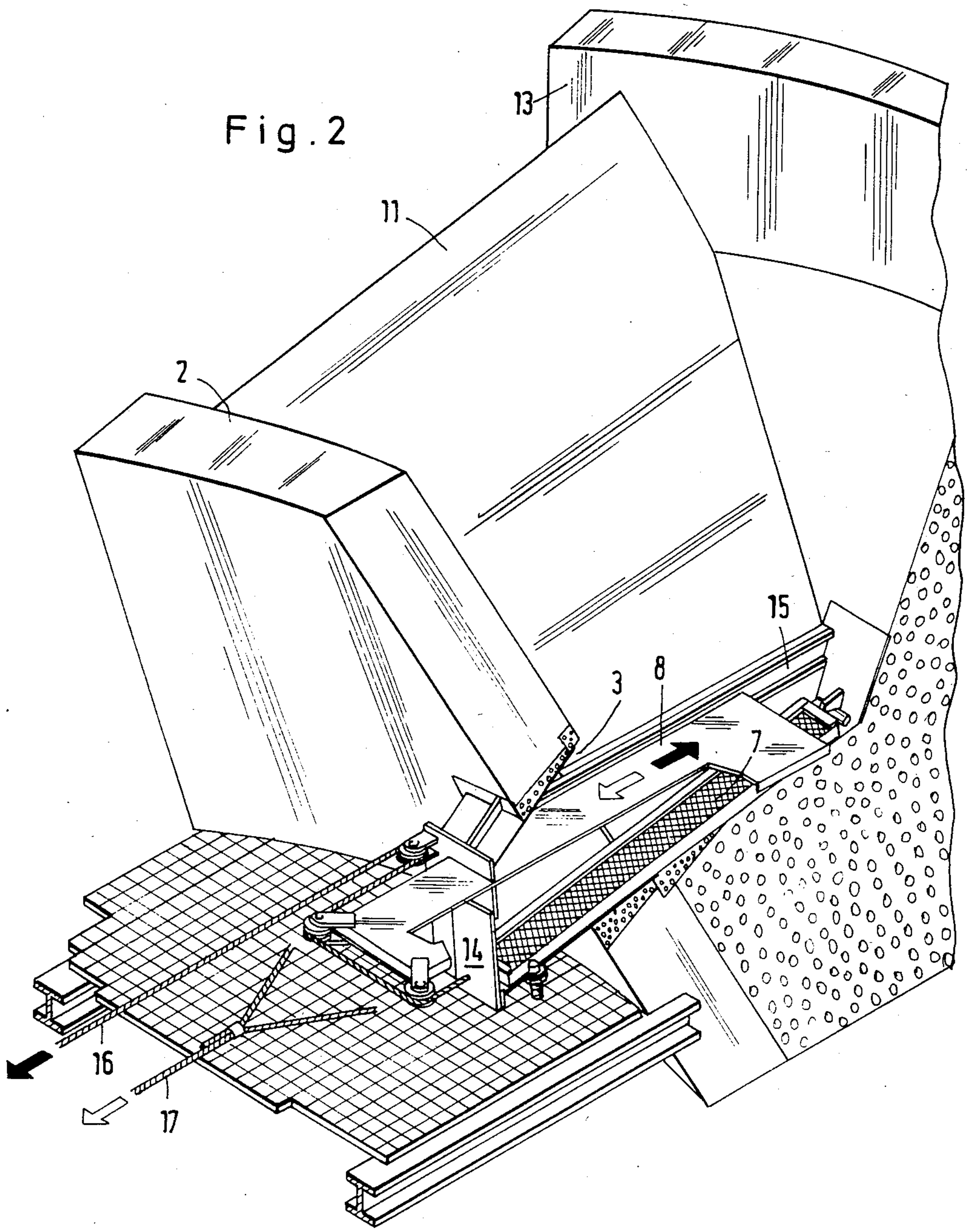
FIG. 2 is a perspective view of an open air conveyor chute with a cover slide for the large volume silo of FIG. 1 in accordance with the invention.

The perspective view according to FIG. 2 shows a cover slide 8 shortly before it reaches a position in which the corresponding air conveyor chute 7 is completely covered. Slide 8 is guided in rails 15 on ramps 11. Hauling cables 16 and 17 are used for operating the slide 8. On pulling on hauling cable 16 in the direction of the black arrow shown in FIG. 2, the cover slide 8 is advanced in the opposite direction into the silo area 1 as shown by the other black arrow in FIG. 2. On pulling on hauling cable 17 in the direction of the white arrow shown in FIG. 2. The slide 8 is moved back into the inner area of conical dome 2 as shown by the other white arrow in FIG. 2.

In operation, normally, several flow regulators 5 are opened to a lesser or greater extent, in order to ensure the desired cone formation and consequently a corresponding mixing and material flow in the storage tank 9. If an open air conveyor chute 7 is now to be replaced, the cover slide 8 is advanced out of position **8*a*, so that the corresponding open air conveyor chute is closed and is freed from the material in silo area 1. By a corresponding control operation of the flow regulators, the work of this air conveyor chute can be undertaken by open air conveyor chutes in other sections. This does not influence operation. After removing the flow regulator from mounting plate 14, it is possible to raise and remove the particular air conveyor chute. The old chute can be replaced by a new air conveyor chute. The cover slide 8 is then retracted back into position 8***a* and operation of that open air conveyor chute can be resumed.

What is claimed is:

1. A large volume silo for bulk material, particularly raw cement powder, having an annular silo base formed by a conical dome with an inner dome area and discharge openings in the conical dome between the silo area and inner dome area, and a storage tank in the inner dome area, the silo comprising:

(a) open air conveyor chutes passing radially inwards to the discharge openings in the conical dome and being selectively controllable;

(b) closed air conveyor chutes in the inner dome area operatively connecting the open air conveyor chutes to the storage tank; and (c) cover slides for covering the open air conveyor chutes and separating the open air conveyor chutes in the silo area from the inner dome area.

2. The silo of claim 1, further comprising flow regulator means, operatively connected between the open air conveyor chutes and closed air conveyor chutes, for selectively controlling the flow of the bulk material from the open air conveyor chutes to the closed air conveyor chutes.

3. The silo of claim 2, wherein the open air conveyor chutes are removeable from the inner dome area when the cover slides for the open air conveyor chutes are covering and separating the open air conveyor chutes from the silo area.

4. The silo of claim 3, wherein the cover slides are selectively moveable from a first position in the inner dome area through the discharge openings to a second position in the silo area covering the open air conveyor chutes.

5. The silo of claim 4, further comprising ramps in the silo base and rails on the ramps for guiding and moving thereon the open air conveyor cover slides.

* * * * *